Jan. 23, 1940.   J. V. O. PALM   2,187,864
METHOD OF MAKING COMPOSITE BEARING STRIPS
Filed June 14, 1939   2 Sheets-Sheet 1
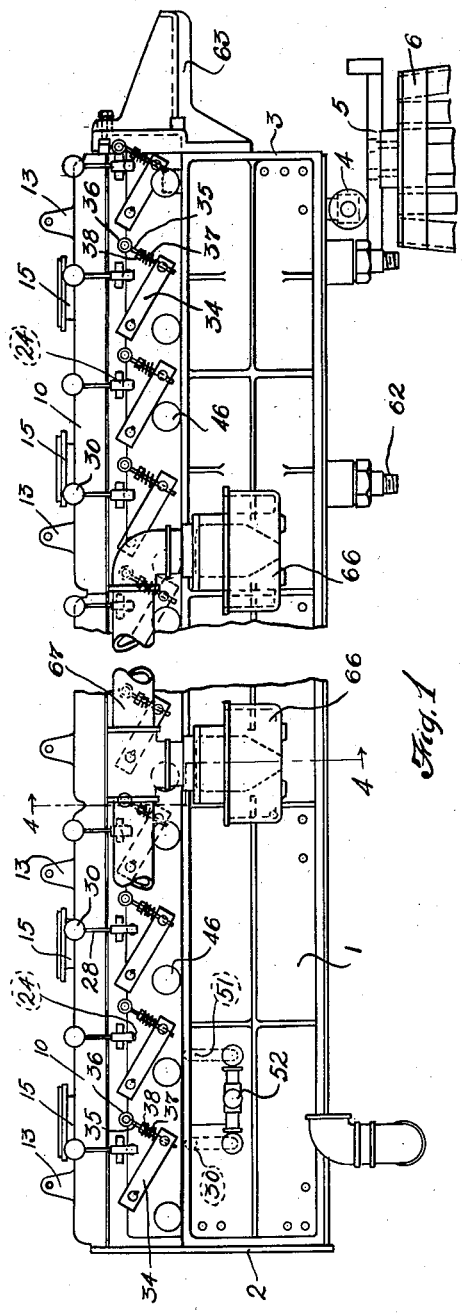
INVENTOR.
John V. O. Palm
BY
Fay, Oberlin & Fay
ATTORNEYS.

Jan. 23, 1940.    J. V. O. PALM    2,187,864
METHOD OF MAKING COMPOSITE BEARING STRIPS
Filed June 14, 1939    2 Sheets-Sheet 2
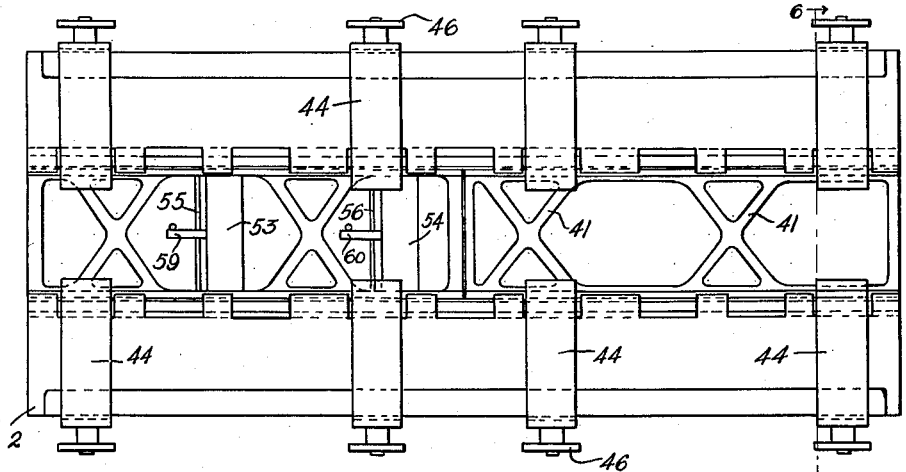
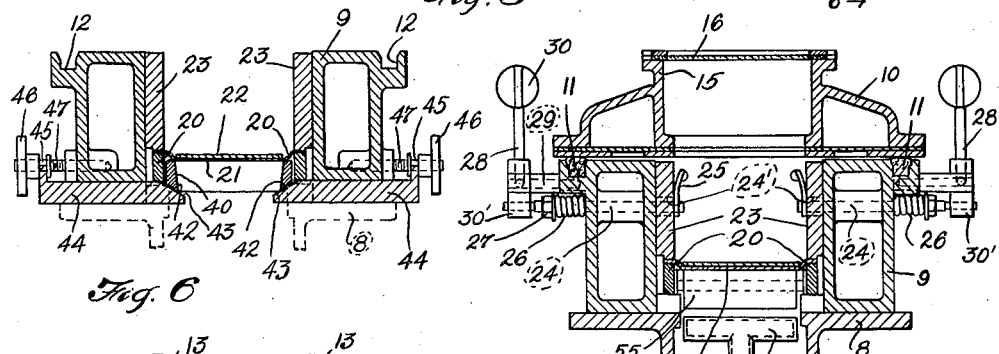
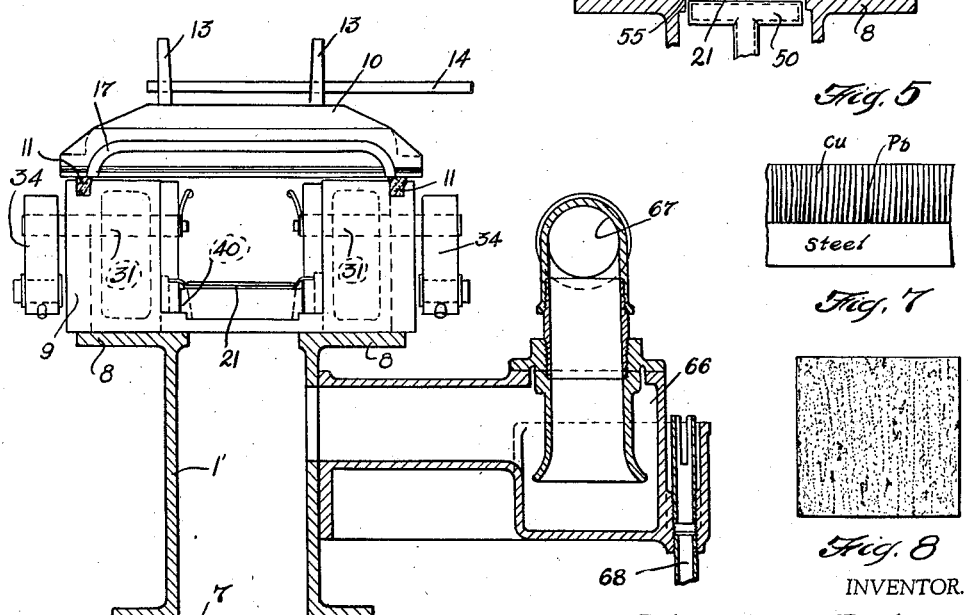
INVENTOR.
BY John V. O. Palm
Bay, Oberlin & Bay
ATTORNEYS.

Patented Jan. 23, 1940

2,187,864

UNITED STATES PATENT OFFICE 2,187,864

METHOD OF MAKING COMPOSITE BEARING STRIPS

John V. O. Palm, Cleveland Heights, Ohio, assignor to The Cleveland Graphite Bronze Company, Cleveland, Ohio, a corporation of Ohio Application June 14, 1939, Serial No. 279,215

3 Claims. (Cl. 148—3)

The present invention relates to a novel method of making a composite bearing strip. More particularly, the invention pertains to a method of fabricating a continuous, composite strip, composed of a layer of plastic bronze bearing material united or bonded to a backing strip composed of ferrous metal such as steel.

The present application is a continuation-in-part of my application filed Oct. 15, 1936, Serial No. 105,775, entitled "Method of making composite bearing strips".

Since a plastic bronze bearing material is composed essentially of a copper matrix with a relatively high percentage of lead constituent, and such metals are practically insoluble or immiscible with each other, it is the general object and nature of the present invention to so treat the plastic bronze bearing strip during its stages of solidification and cooling from the molten state, as to produce a metallographic structure wherein the lead constituent will be finely and evenly distributed throughout the copper matrix and the optimum bearing structure properties will be present. A further object of the invention is to provide a method of solidifying and cooling the composite strip wherein the desired structure of the plastic bronze layer will be obtained simultaneously without producing any undesired or detrimental physical or structural properties in the dissimilar metal of which the backing strip is composed.

Additional objects and advantages of the invention shall become apparent as the following description proceeds.

To the accomplishment of the foregoing and related ends, said invention, then, consists of the method hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In said annexed drawings:

Figure 1 is an elevational view of the apparatus embodying my invention, such view being broken away in the middle for the purpose of shortening and convenience in representation; Fig. 2 is a partially sectioned view similar to Fig. 1; Fig. 3 is a plan view taken in the direction of the arrows 3—3 of Fig. 2 and being an enlargement of the area substantially defined by said arrows; Fig. 4 is an enlarged, cross-sectional view of the apparatus shown in Fig. 1 and taken substantially along line 4—4 thereof; Fig. 5 is an enlarged, cross-sectional, detailed view of the portion of the apparatus shown in Fig. 2 and taken substantially along line 5—5 thereof; Fig. 6 is a sectional view taken substantially along line 6—6 of Fig. 3; Fig. 7 represents a photomacrograph taken at ten diameters of a cross section of the composite bearing strip; and Fig. 8 represents a photomicrograph taken at one hundred diameters of the bearing metal layer in the finished composite strip.

Now referring more particularly to the drawings, the apparatus shown therein consists generally of an elongated housing 1 adapted to be attached by means of the transverse flange 2 to the outlet side of a molten metal pouring device such as illustrated in my co-pending application "Method of and apparatus for making composite bearing strip" filed Oct. 15, 1936, Serial No. 105,776. The opposite or right hand end 3 of the housing 1 carries rollers 4 adapted to ride on the track 5 which in turn is carried upon the supporting frame 6. The last described structure constitutes a horizontally movable support for the purpose of accommodating contraction and expansion throughout the length of the housing 1.

As will be seen by reference to Fig. 4, the housing 1 is of a T-shaped cross-section composed of individual base units 1' mounted upon the base plate 7. Horizontally extending flanges 8 on the top of the base unit 1' serve as a base or support for the individual top casting units 9. Cover casting units 10 are in turn carried upon the upper face of the units 9 and are suitably sealed thereto by means of the marginal packing material 11 located in the channels 12 in the upper face of the units 9.

Upwardly projecting bosses 13 on the cover castings 10 have aligned openings for the reception of a bar 14 whereby the cover units 10 may be removed and assembled into position. Upwardly extending flanges 15, normally covered by the glass inspection plates 16 are located at suitable intervals throughout the length of the housing 1 in order that the interior thereof might be subject to visual inspection. Grooves 17 for the reception of packing material are also provided in the vertical end faces of the cover units 10 in order to insure the properly sealed fit between the ends of such individual units.

The top casting units 9 carry a pair of horizontally disposed strip guide rails 20 which are adapted to bear against the under side of the flanges of the steel backing strip 21. A layer of plastic or high lead bronze bearing material 22, which has been poured upon the surface of the steel strip 21 by the pouring apparatus (not shown) is located on the upper surface of the steel strip 21 between the lateral edge flanges of the latter.

Hold-down plates 23 are mounted upon the inner walls of the top casting 9 and having their lower edges bearing against the upper faces of the lateral edge flanges of the strip 21. Shafts 24 extend through enlarged openings 24' in the hold-down plates 23 and have their inner ends fastened to the inner faces of the plates 23 by means of the flat keys 25. The outer ends of the shafts 24 are spring loaded by means of the compression springs 26 bearing against the outer wall of the top casting 9 and the washer and nut 27. Levers 28 are fulcrumed upon the supports 29. The levers 28 have the operating handles 30 on their upper ends, and their lower ends 30' are adopted to engage with a shoulder on the outer end of the shafts 24 whereby the latter may be forced inwardly against the tension of the springs 26 and disconnected from the plates 23 by withdrawing the keys 25.

Rock shafts 31 are also journalled in the side walls of the top casting units 9 and carry the cams 32 on their inner ends which bear against the shoulder 33 in the hold-down plates 23. Levers 34 are mounted on the outer ends of the rock shafts 31 and are slidably connected at their outer ends to the bars 35 which are pivotally mounted at 36. A compression spring 37 is mounted on the bar 35 between the lever 34 and the adjusting nut 38 whereby the downward force exerted upon the levers 34 may be adjustably regulated. Such downward force exerted upon the ends of the levers 34 is transmitted through the rock shafts 31 to the cams 32 and to the shoulders 33 on the hold-down plates 23. In this manner the hold-down plates 23 are pressed against the upper face of the lateral edge flanges of the steel strip 21, serving to hold the latter in properly aligned position as it is drawn through the apparatus.

A grille work casting 40 having the X-shaped cross bars at spaced intervals is located immediately beneath the under side of the steel strip 21 and serves as a means for supporting and guiding the intermediate portion of such strip. The bottom lateral edges of the grille work casting 40 are beveled as indicated at 42 and adapted to be engaged by the beveled faces 43 of the wedge plates 44, which also contact the under side of the guide rails 20. The wedge plates 44 extend outwardly to the exterior of the top casting units 9 and have upwardly extending flanges which are engaged by the collar 45 on the adjusting wheels 46 which in turn are threadedly mounted upon the studs 47 carried by the top casting units 9. Thus by means of adjustably moving the wedge plates 44 inwardly and outwardly with respect to the grille work casting 40, it is possible to adjust the horizontal alignment of the latter and of the guide rails 20, and to thereby control the position of the composite bearing strip as it is drawn through the apparatus. Since the steel strip 21 is normally flexible and enters the apparatus at a red hot temperature and is slowly cooled from about 1400° F. through its critical range, and also since the lead bronze layer 22 is initially in a fluid or molten state, and subsequently cooled through a semi-fluid or plastic state to solidification, it is of utmost importance that the composite strip be maintained in proper alignment as it moves through the apparatus. As the position of the apparatus housing 1 might change due to settling or due to expansion and contraction from alternate heating and cooling, it becomes all the more important and necessary to provide means for delicately controlling the alignment of the composite strip guide ways.

Now referring to Figs. 1, 2, 3 and 5, the cooling of the composite bearing strip as it passes into the apparatus is effected and controlled in a certain desired manner by means of sprays of cooling water directed through the grille work 40 and against the under side of the steel strip 21. At the left hand or entering end of the apparatus, there are located a pair of spray pipes 50 and 51 to which cooling water is supplied through the connection 52. Immediately above the spray pipes 50 and 51 are located the baffle plates 53 and 54 respectively. The baffle plates 53 and 54 are pivotally mounted upon the rock shafts 55 and 56 respectively. And counter-balanced weights 57 and 58 are connected to the baffle plates 53 and 54, by means of the hooked arms 59 and 60 extending outwardly from the rock shafts 55 and 56 in a direction opposite to that of the baffle plates 53 and 54. The spray from the spray pipes 50 and 51 is directed first against the baffle plates 53 and 54, and the latter, by virtue of their mounting upon the rock shafts 55 and 56 and through the force of the weights 57 and 58, are held in a position with their edges against the under side of the steel strip 21. In this manner the cooling spray from the spray nozzles 50 and 51, which first impinges against the composite bearing strip is confined in a clear-cut, straight line across the width of the strip, so that no particular locality or area of the strip, as it moves through the apparatus, will be subjected to a cooling action in advance of any other.

In the right hand portion of the apparatus, there are located a series of spray heads 61, receiving cooling water through the feed lines 62 and adapted to direct practically a solid spray against the composite bearing strip.

A guide bracket 63 is located on the right hand end 3 of the cooling apparatus housing and a wiper 64 is adapted to bear against the upper surface of the strip above the guide bracket 63. The wiper 64 serves the dual function of removing excess cooling liquid from the upper surface of the composite strip and also operates as an air and gas sealing means at the outlet end of the apparatus.

A cooling liquid drain pipe outlet is located in the housing base 7 as indicated at 65. Combined overflow outlets and steam traps 66 are also positioned at spaced points along the housing 1. Steam generated through the cooling action is withdrawn through the manifold 67 and overflow water is withdrawn through the outlet pipe 68.

A reducing or non-oxidizing gas pipe 69 is located in the left hand end portion of the housing 1 adjacent the inlet end of the apparatus.

The method of cooling the composite bearing strip initially consisting of the steel backing strip 21 of a carbon content of not more than 0.30% and the layer of molten plastic bronze 22 is as follows: Immediately after the composite strip enters the left hand or inlet end of the apparatus, at a temperature of about 1700° to 1800° F., the cooling spray through the nozzles 50 and 51 is directed in a straight line across the under side of the backing strip 21. This cooling spray is so controlled in volume and temperature, and in correlation with the rate of travel of the composite strip as to rapidly solidify the plastic bronze and to lower the temperature of the steel strip 21 to about 1400° F. which is just above the critical range of the steel of a carbon content ordinarily used in practice. After such initial cooling, the composite strip then passes through the apparatus for a substantial time and distance (i. e., between the cooling spray nozzle 51 and the face of the series of spray heads 61) wherein the steel strip 21 is slowly cooled through its critical range. In this manner, and due to such slow cooling, any sudden quenching of the steel strip 21, with a resultant increase in the hardness and brittleness of the steel is avoided.

As the composite strip, in the last portion of its travel through the apparatus, passes over the spray head 61, and after the steel strip 21 has slowly cooled through its critical range, the entire strip is then cooled to room temperature and emerges from the apparatus, ready for final finishing, blanking and forming operations.

By reason of the operation of the above described process, the resultant composite strip, in its solidified form, possesses the micro and macro structure of its plastic bronze bearing metal layer 22 as illustrated in Figs. 7 and 8. As will be noted from these last two figures, the resultant article has a bearing metal layer in which the immiscible lead constituent is evenly and finely distributed in elongated and streak-like areas throughout the copper matrix. Such elongated streak-like areas are disposed in a direction normal to the surface of the steel backing strip. As will be seen from Fig. 7, the macro structure of the resultant product consists of a columnar copper matrix with the lead constituent interspersed between the matrix columns, and that the columns of copper matrix are normal to the surface of the steel backing strip. In this manner not only does the plastic bronze bearing metal layer possess a greater compressive strength and therefore a greater resistance to wear, but the structure of the bearing metal layer is so arranged with respect to the steel backing strip, that the direction of its maximum compressive strength is the same as the direction of applicaiton of compressive forces in the finished article, viz., in a direction normal to the surface of the strip.

Other modes of applying the principle of my invention may be employed instead of the one explained, change being made as regards the means and the steps herein disclosed, provided those stated by any of the following claims or their equivalent be employed.

I therefore particularly point out and definitely claim as my invention:

1. In a method of making a composite plastic bronze strip, the steps of applying a molten plastic bronze layer to a ferrous backing metal strip having a carbon content less than 0.30% at a temperature above the critical range of said ferrous strip, quickly cooling said bronze layer to a temperature sufficient to solidify the copper constituent of said bronze layer, but not below the critical range of said backing metal strip, then slowly cooling said strip to a temperature below the critical range of said backing metal strip, then quickly cooling to atmospheric temperature, and enclosing said backing metal strip and said bronze layer in a non-oxidizing atmosphere during the performance of the foregoing steps.

2. In a method of making a copper plastic bronze bearing strip, the steps of heating a ferrous backing metal strip having a carbon content less than 0.30% to the range of approximately 1700° to 1800° F., applying molten plastic bronze to the surface of said strip, continuously moving said strip, quickly cooling said strip and bronze to approximately 1400° F., and then slowly cooling said strip.

3. In a method of making a composite plastic bronze strip, the steps of applying a molten plastic bronze layer to a ferrous backing metal strip having a carbon content less than 0.30% at a temperature above the critical range of said ferrous metal, continuously moving said strip, quickly cooling said bronze layer to a temperature above the critical temperature of the ferrous backing by directing a cooling spray against the under side of said strip with the leading edge of said spray in a straight transverse line across said strip, and then slowly cooling said strip to a temperature below the critical range of said ferrous metal.

JOHN V. O. PALM.